United States Patent
Okajima

(10) Patent No.: US 10,310,781 B2
(45) Date of Patent: Jun. 4, 2019

(54) IMAGE-PROCESSING APPARATUS CAPABLE OF EXECUTING IMAGE PROCESSES AND NOTIFYING USER OF INFORMATION ABOUT UPDATE OF FIRMWARE FOR EXECUTING IMAGE PROCESS

(71) Applicant: BROTHER KOGYO KABUSHIKI KAISHA, Nagoya, Aichi (JP)

(72) Inventor: Jun Okajima, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/924,513

(22) Filed: Mar. 19, 2018

(65) Prior Publication Data
US 2018/0285027 A1  Oct. 4, 2018

(30) Foreign Application Priority Data
Mar. 29, 2017  (JP) .................................. 2017-064850

(51) Int. Cl.
*G06F 3/12* (2006.01)
*H04N 1/00* (2006.01)

(52) U.S. Cl.
CPC ............ *G06F 3/123* (2013.01); *G06F 3/1204* (2013.01); *G06F 3/1288* (2013.01); *H04N 1/00474* (2013.01)

(58) Field of Classification Search
None
See application file for complete search history.

(56) References Cited

U.S. PATENT DOCUMENTS

| 9,678,742 B2* | 6/2017 | Kanematsu ............... G06F 8/65 |
| 9,983,865 B2* | 5/2018 | Tsuboi ..................... G06F 3/123 |
| 2006/0116166 A1* | 6/2006 | Hibino .................. H04W 28/18 455/557 |
| 2008/0052702 A1* | 2/2008 | Chuang ..................... G06F 8/65 717/170 |

(Continued)

FOREIGN PATENT DOCUMENTS

| JP | H05-300299 A | 11/1993 |
| JP | 2016-143305 A | 8/2016 |

*Primary Examiner* — Dung D Tran
(74) *Attorney, Agent, or Firm* — Scully, Scott, Murphy & Presser, PC

(57) ABSTRACT

An image-processing apparatus includes a storage and a controller. The storage stores therein firmware for executing a plurality of image processes. The firmware includes a plurality of sets of sub firmware for executing respective ones of the image processes. The controller is capable of executing the image processes in accordance with the firmware. The controller is configured to perform: receiving update information about an update of the firmware from a server; when receiving an instruction to execute one of the image processes, determining whether the received update information includes specific information about an update of specific sub firmware which is one of the plurality of sets of sub firmware and is for executing the one of the image processes; and when determining that the received update information includes the specific information, notifying of notification information about the update of the specific sub firmware on the basis of the specific information.

12 Claims, 12 Drawing Sheets

(56) References Cited

U.S. PATENT DOCUMENTS

| | | | | |
|---|---|---|---|---|
| 2008/0127159 | A1* | 5/2008 | Regenmorter | G06F 8/65 717/168 |
| 2009/0009792 | A1* | 1/2009 | Zimmerman | G06F 3/1211 358/1.15 |
| 2009/0235242 | A1* | 9/2009 | Kawaguchi | H04N 1/00002 717/168 |
| 2011/0286022 | A1* | 11/2011 | Kakitsuba | G06F 3/1204 358/1.13 |
| 2012/0084767 | A1* | 4/2012 | Ishimoto | G06F 8/65 717/173 |
| 2014/0160508 | A1* | 6/2014 | Suwabe | G03G 15/50 358/1.13 |
| 2014/0282481 | A1* | 9/2014 | Ohara | G06F 8/65 717/172 |
| 2015/0317103 | A1* | 11/2015 | Niwa | G06F 8/654 358/1.15 |
| 2015/0331641 | A1* | 11/2015 | Michishita | G06F 8/65 358/1.13 |
| 2016/0019048 | A1* | 1/2016 | Tsuboi | G06F 3/123 717/168 |

* cited by examiner

FIG. 2

| MODEL | APPARATUS VERSION | UPDATE INFORMATION | THE LATEST VERSION FILE |
|---|---|---|---|
| A-MODEL | ver. A | SCAN: ADDITION OF NEW FUNCTION + FACSIMILE: ELIMINATION OF DEFECT + COPY: ELIMINATION OF DEFECT | ModelA_verE.prg |
| | ver. B | SCAN: ADDITION OF NEW FUNCTION + FACSIMILE: ELIMINATION OF DEFECT | |
| | ver. C | SCAN: ADDITION OF NEW FUNCTION + FACSIMILE: ELIMINATION OF DEFECT | |
| | ver. D | SCAN: ADDITION OF NEW FUNCTION | |
| | ver. E | NO DIFFERENCE | |
| B-MODEL | ver. A | SCAN: ADDITION OF NEW FUNCTION + FACSIMILE: ELIMINATION OF DEFECT | ModelB_verC.prg |
| | ver. B | SCAN: ADDITION OF NEW FUNCTION | |
| | ver. C | NO DIFFERENCE | |
| ... | ... | ... | ... |

80

IMAGE-PROCESSING APPARATUS CAPABLE OF EXECUTING IMAGE PROCESSES AND NOTIFYING USER OF INFORMATION ABOUT UPDATE OF FIRMWARE FOR EXECUTING IMAGE PROCESS

CROSS REFERENCE TO RELATED APPLICATION

This application claims priority from Japanese Patent Application No. 2017-064850 filed Mar. 29, 2017. The entire content of the priority application is incorporated herein by reference.

TECHNICAL FIELD

The present disclosure relates to an image-processing apparatus that can execute a plurality of image processes.

BACKGROUND

An image-processing apparatus that can execute a plurality of image processes (i.e., a plurality of types of image processes) stores firmware for executing the plurality of image processes. Each of the plurality of image processes is executed by the stored firmware. Generally, firmware is improved for addition of a new function, removal of a defect, or some other reasons, and firmware of a new version is distributed to the image-processing apparatus. When receiving distribution of the firmware of the new version, the image-processing apparatus displays a notification screen for prompting a user to update the current firmware to the firmware of the new version. Japanese Patent Application Publication No. H05-300299 discloses an example of an image-processing apparatus that displays such a notification screen.

SUMMARY

According to the technique disclosed in the JP Publication '299, display of the notification screen contributes to some degree to notification of update of the firmware; however, more effective notification of the update of firmware is now desired.

It is therefore an object of the disclosure to provide an image-processing apparatus capable of effectively notifying a user of the update of firmware.

In order to attain the above and other objects, according to one aspect, the disclosure provides an image-processing apparatus including a communication interface, an input interface, a storage, and a controller. The storage stores firmware for executing a plurality of image processes. The firmware includes a plurality of sets of sub firmware for executing respective ones of the plurality of image processes. The controller is capable of executing the plurality of image processes in accordance with the firmware. The controller is configured to perform: receiving update information from a server via the communication interface, the update information being about an update of the firmware; in response to receiving via the input interface an instruction to execute one of the plurality of image processes, determining whether the received update information includes specific information about an update of specific sub firmware, the specific sub firmware being one of the plurality of sets of sub firmware and being for executing the one of the plurality of image processes; and in response to determining that the received update information includes the specific information, notifying of notification information about the update of the specific sub firmware on the basis of the specific information.

According to another aspect, the disclosure provides a non-transitory computer readable storage medium storing a set of instructions for an image-processing apparatus. The image-processing apparatus includes a communication interface, an input interface, a storage, and a controller. The storage stores firmware for executing a plurality of image processes. The firmware includes a plurality of sets of sub firmware for executing respective ones of the plurality of image processes. The controller is capable of executing the plurality of image processes in accordance with the firmware. The set of program instructions, when executed by the controller, causes the image-processing apparatus to perform: receiving update information from a server via the communication interface, the update information being about an update of the firmware; in response to receiving via the input interface an instruction to execute one of the plurality of image processes, determining whether the received update information includes specific information about an update of specific sub firmware, the specific sub firmware being one of the plurality of sets of sub firmware and being for executing the one of the plurality of image processes; and in response to determining that the received update information includes the specific information, notifying of notification information about the update of the specific sub firmware on the basis of the specific information.

According to still another aspect, the disclosure provides a communication system including an image-processing apparatus and a server. The image-processing apparatus includes a communication interface, an input interface, a storage, and a controller. The storage stores firmware for executing a plurality of image processes. The firmware includes a plurality of sets of sub firmware for executing respective ones of the plurality of image processes. The server includes a storage storing update information about an update of the firmware. The controller is capable of executing the plurality of image processes in accordance with the firmware. The controller is configured to perform: receiving the update information from a server via the communication interface; in response to receiving via the input interface an instruction to execute one of the plurality of image processes, determining whether the received update information includes specific information about an update of specific sub firmware, the specific sub firmware being one of the plurality of sets of sub firmware and being for executing the one of the plurality of image processes; and in response to determining that the received update information includes the specific information, notifying of notification information about the update of the specific sub firmware on the basis of the specific information.

BRIEF DESCRIPTION OF THE DRAWINGS

The particular features and advantages of the disclosure will become apparent from the following description taken in connection with the accompanying drawings, in which:

FIG. 2 is a diagram illustrating a table stored in a management server of the communication system according to the first embodiment of the present disclosure;

DETAILED DESCRIPTION

First Embodiment

First, a communication system according to a first embodiment of the present disclosure will be described while referring to FIGS. 1 to 7.

<Configuration of Communication System>

Figure 1:
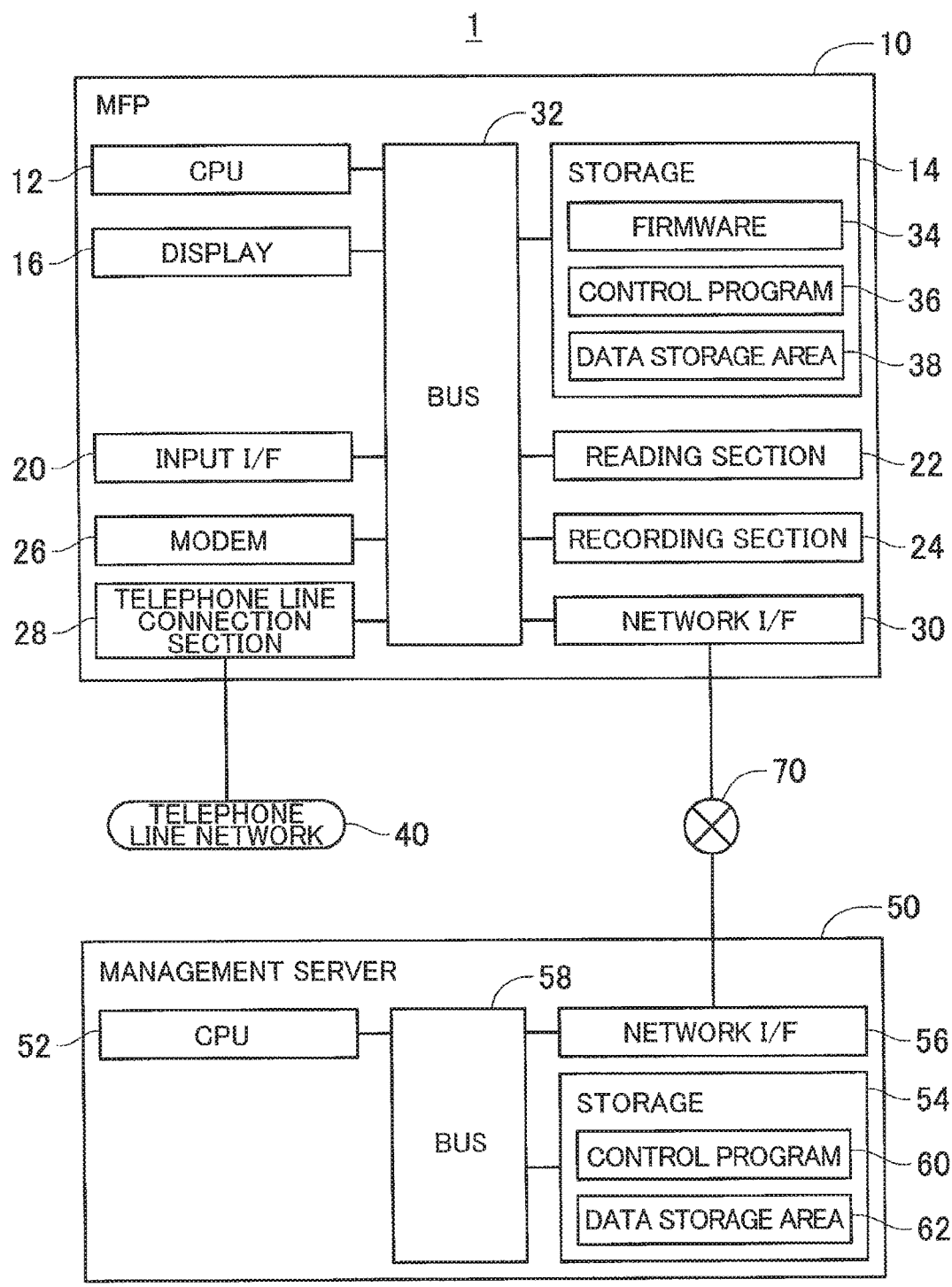
FIG. 1 is a block diagram of a communication system according to a first embodiment of the present disclosure.

FIG. 1 is a block diagram illustrating a communication system 1 as an example of the communication system according to the first embodiment of the present disclosure. The communication system 1 includes a Multifunction Peripheral 10 (hereinafter, abbreviated as "MFP 10") and a management server 50. The MFP 10 is an image-processing apparatus that can execute a plurality of image processes (i.e., a plurality of types of image processes) such as a copy process, a scan process, and a facsimile transmission/reception process (hereinafter, simply referred to as "facsimile process"). The management server 50 is a server for managing information relating to update of firmware for each of image-processing apparatuses (including the MFP 10). The MFP 10 and the management server 50 are connected to the Internet 70 and can communicate with each other over the Internet 70.

The MFP 10 includes a CPU 12, a storage 14, a display 16, an input interface 20 (hereinafter, referred to as "input I/F 20"), a reading section 22, a recording section 24, a modem 26, a telephone line connection section 28, and a network interface 30 (hereinafter, referred to as "network I/F 30"). The above components can communicate with one another via a bus 32.

The CPU 12 is configured to execute processes in accordance with firmware 34 and a control program 36, both of which are stored in the storage 14. The firmware 34 is a program for executing the plurality of processes such as the copy process, the scan process, and the facsimile process. More specifically, the firmware 34 includes firmware for each of the plurality of image processes. That is, the firmware 34 includes firmware for executing the copy process, firmware for executing the scan process, and firmware for executing the facsimile process. The control program 36 is a program for executing update of the firmware 34. Hereinafter, the CPU 12 executing the control program 36 is sometimes simply referred to by a program name. For example, "the CPU 12 that executes the control program 36" is sometimes referred to simply as "the control program 36." The firmware for executing the copy process is an example of sub firmware. The firmware for executing the scan process is an example of sub firmware. The firmware for executing the facsimile process is an example of sub firmware.

The storage 14 is constituted by combining a RAM (Random Access Memory), a ROM (Read Only Memory), a flash memory, an HDD (Hard Disk Drive), and a buffer that the CPU 12 has. The storage 14 further includes a data storage area 38. The data storage area 38 stores therein data required to execute the control program 36.

The display 16 has a display surface that displays functions of the MFP 10. The display 16 may be, e.g., an LCD (Liquid Crystal Display), an organic EL, or a plasma display. The input I/F 20 is configured to receive various instructions through user operations to icons and buttons displayed on the display 16. In the present embodiment, the input I/F 20 is a touch panel integrally constituted with the display 16. Alternatively, the input I/F 20 may be a hard key.

The reading section 22 is configured to read and scan an image. That is, the scan process is executed using the reading section 22. The reading section 22 is, e.g., a CCD image sensor or a contact image sensor. The recording section 24 is a print mechanism. The recording section 24 may be, e.g., an inkjet head. The CPU 12 inputs a drive signal to the recording section 24. When the inkjet head is employed as the recording section 24, the recording section 24 ejects ink from nozzles on the basis of the inputted drive signal. The copy process is executed using the recording section 24.

The modem 26 is configured to modulate document data to be transmitted by a facsimile function into a signal that can be transmitted to a telephone line network 40 and to transmit the signal to the telephone line network 40 via the telephone line connection section 28. The modem 26 is further configured to receive a signal inputted from the telephone line network 40 via the telephone line connection section 28 and to demodulate the received signal to reproduce document data. The network I/F 30 is an interface for exchanging signals with external devices over the Internet 70. The facsimile process is executed using the modem 26 and the network I/F. The network I/F 30 is an example of a communication interface.

The management server 50 includes a CPU 52, a storage 54, and a network interface 56 (hereinafter, referred to as "network I/F 56"). The above components can communicate with one another via a bus 58.

The CPU 52 is configured to execute processes in accordance with a control program 60 stored in the storage 54. The control program 60 is a program for managing information relating to update of the firmware of each of the image-processing apparatuses (including the MFP 10).

The storage 54 is constituted by combining a RAM, a ROM, a flash memory, an HDD, and a buffer that the CPU 52 has. The storage 54 further includes a data storage area 62. The data storage area 62 stores therein data required to execute the control program 60. The network I/F 56 is an interface for exchanging signals with external devices over the internet 70.

<Operation of Communication System>

In the communication system 1, the management server 50 stores therein information (hereinafter, referred to as "update information") about update of the firmware of each of the image-processing apparatuses (including the MFP 10). In response to a request from the MFP 10, the update information is transmitted from the management server 50 to the MFP 10. As described above, the MFP 10 can execute the plurality of image processes such as the copy process, the scan process, and the facsimile process. Accordingly, the firmware 34 of the MFP 10 is updated by each image process.

Thus, the update information includes information about update for each of the plurality of image processes. Accordingly, on the basis of the update information, the presence/absence of update can be determined for each of the plurality of image processes. That is, for example, it can be determined on the basis of the update information that update is available for each of the firmware for executing the scan process and the firmware for executing the facsimile process and that update is unavailable for the firmware for executing the copy process.

Accordingly, in the MFP 10, when an instruction to execute one image process from among the plurality of image processes is received via the input I/F 20, it is determined whether or not information about update of the firmware for executing the one image process is included in the update information. When the information on the update of the firmware for executing the one image process is included in the update information, a screen indicating that the update of the firmware for executing the one image process is available is displayed on the display 16.

Specifically, a table 80 illustrated in FIG. 2 is stored in the data storage area 62 of the management server 50. In this table 80, the update information is registered for each model of the image-processing apparatuses (including the MFP 10). The update information includes information (hereinafter, referred to as "difference information") relating to differences between firmware for update (i.e., firmware of the latest version) and the firmware of the version stored in the image-processing apparatuses (including the MFP 10). Hereinafter, the version of the firmware stored in each of the image-processing apparatuses (including the MFP 10) is referred to as "apparatus version."

Note that, in each of the image-processing apparatuses (including the MFP 10), when the firmware has been updated to the latest version, the apparatus version is the latest version. On the other hand, when the firmware has not been updated to the latest version, the apparatus version is the previous version, i.e., the version of the firmware before distribution of the firmware of the latest version. Thus, for each of the image-processing apparatuses whose apparatus version is the previous version, information in which each image process to be subjected to update among the plurality of image processes that can be executed in the image-processing apparatus is associated with a summary of update is registered in the table 80 as the difference information. The summary of update indicates, in a simplified manner, the content to be improved by the update. Examples of the summary of update includes addition of a new function by the update, removal of a defect by the update. When the apparatus version is the latest version, the apparatus version and the latest version are identical to each other, that is, no difference exists between them. Therefore, for each of the image-processing apparatuses whose apparatus version is the latest version, information indicating that no difference exists is registered in the table 80 as the difference information.

More specifically, for example, for the image-processing apparatus whose model is "model-A" and whose apparatus version is "ver. B," information indicating that a new function is added to the scan process by the update and information indicating that a defect of the facsimile process is eliminated by the update are registered in the table 80 as the difference information. Further, for example, for the image-processing apparatuses whose model is "model-A" and whose apparatus version is "ver. E," information indicating that no difference exists between the apparatus version and the latest version is registered in the table 80 as the difference information.

For each model of the image-processing apparatuses, a file name of the firmware of the latest version is also registered in the table 80 and a file corresponding to the file name, i.e., the firmware of the latest version is stored in the data storage area 62 of the management server 50.

The management server 50 stores the above-described update information, and the MFP 10 periodically transmits a request of the update information (hereinafter, referred to as "update information request") to the management server 50 at a predetermined time interval. The update information request includes information for identifying the model of the MFP 10 and information relating to the version of the firmware 34 stored in the data storage area 38. Upon receiving the update information request, the management server 50 identifies the version of the firmware 34 stored in the MFP 10 (i.e., the apparatus version of the MFP 10) and the model of the MFP 10 on the basis of the information included in the received update information request.

Then, the management server 50 extracts update information corresponding to the identified model and apparatus version from among the plurality of sets of update information registered in the table 80. For example, when it is determined, on the basis of the received update information request, that the model of the MFP 10 is "model-A" and that the apparatus version is "ver. D," the management server 50 extracts update information including information indicating that a new function is added to the scan process by the update. Subsequently, the management server 50 transmits the extracted update information to the MFP 10.

After then, the MFP 10 analyzes the received update information and determines the presence/absence of image process to be subjected to update. At this time, when there are any image processes to be subjected to update, that is, when the difference information included in the received update information includes information relating to any image processes, the received update information is stored in the data storage area 38. On the other hand, when there is no image process to be subjected to update, that is, when the difference information included in the received update information does not include information relating to any image processes, more specifically, when the difference information is information indicating that no difference exists between the apparatus version and the latest version, the received updated information is not stored in the data storage area 38.

Figure 3:
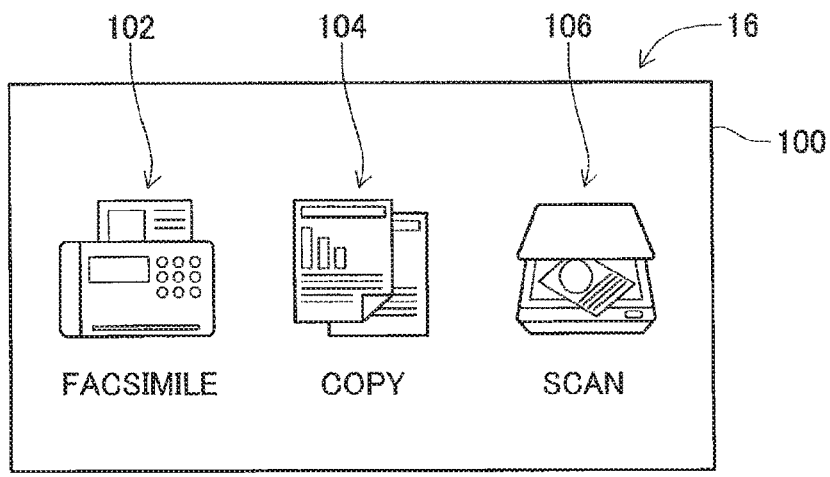
FIG. 3 is a diagram illustrating a process selection screen displayed on a display of an MFP of the communication system according to the first embodiment of the present disclosure.

Since the MFP 10 can execute the copy process, the scan process, and the facsimile process, a process selection screen 100 for a user to select his or her desired image process from among the copy process, the scan process, and the facsimile process is displayed on the display 16 as illustrated in FIG. 3. On the process selection screen 100, a selection button 102 for selecting the facsimile process, a selection button 104 for selecting the copy process, and a selection button 106 for selecting the scan process are displayed. When any one of the three selection buttons 102, 104, and 106 is operated on the process selection screen 100, usually, a screen corresponding to the operated selection button is displayed on the display 16 and the image process corresponding to the operated selection button is executed. Hereinafter, the image process corresponding to the operated selection button is referred to as "selected process."

Figure 4:
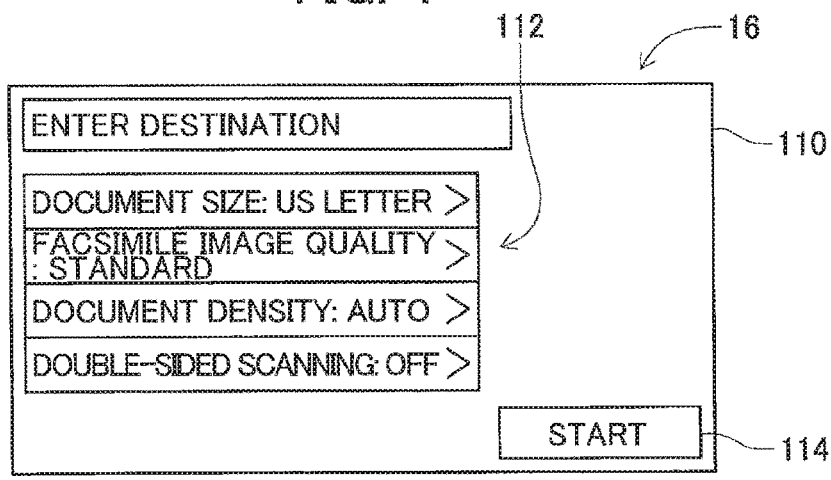
FIG. 4 is a diagram illustrating a selected process screen displayed on the display of the MFP of the communication system according to the first embodiment of the present disclosure.

For example, when the selection button 102 is operated on the process selection screen 100, usually, a selected process screen 110 for executing the facsimile process is displayed on the display 16, as illustrated in FIG. 4. The selected process screen 110 includes a plurality of setting buttons 112 for making the setting of the facsimile process and a start button 114 for starting the facsimile process. The setting of the facsimile process is made by operating the setting buttons 112, and then the start button 114 is operated, whereby the facsimile process is executed. The selected process screen 110 is an example of a second screen.

However, in the MFP 10, despite the fact that a desired image process has been selected on the process selection screen 100, a screen for notifying a user of the update information is displayed on the display 16 when information about the firmware for executing the desired image process (i.e., the selected process) is included in the update information stored in the data storage area 38. That is, in a case where the MFP 10 has received from the management server 50 the update information about the firmware for executing the selected process, the screen for notifying of the update information is displayed on the display 16.

Specifically, for example, when the selection button 102 is operated on the process selection screen 100, that is, when the facsimile process is selected as the selected process, it is determined whether or not information relating to the facsimile process is included in the update information stored in the data storage area 38. That is, for example, when the model of the MFP 10 is "model-A" and the apparatus version is "ver. C" (see FIG. 2), information indicating that a new function is added to the scan process by the update and information indicating that a defect of the facsimile process is eliminated by the update are stored in the data storage area 38 as the update information. In such a case, it is determined that information about the facsimile process is included in the update information stored in the data storage area 38. Then, the information on the selected process included in the update information is displayed on the display 16 as the a notification screen. That is, the information about the facsimile process is displayed on the display 16 as the notification screen.

Figure 5:
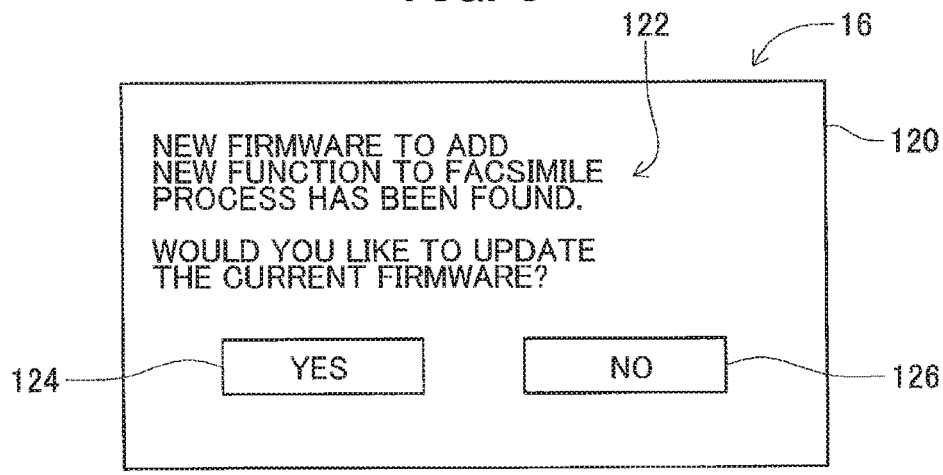
FIG. 5 is a diagram illustrating a notification screen displayed on the display of the MFP of the communication system according to the first embodiment of the present disclosure.

Specifically, a notification screen 120 illustrated in FIG. 5 is displayed on the display 16. On the notification screen 120, there is displayed a comment 122 notifying that new firmware for adding a new function to the facsimile process is available. The notification screen 120 includes an operation button 124 for permitting update of the firmware 34 and an operation button 126 for not permitting the update. When a user permits the update of the firmware 34 and operates the operation button 124, the selected process is stored in the data storage area 38, that is, selection process information for specifying the selected process is stored in the data storage area 38. Then, the MFP 10 transmits a request (hereinafter, simply referred to as "firmware request") for firmware for update (i.e., firmware of the latest version) to the management server 50. The firmware request includes information for identifying the model of the MFP 10.

The management server 50 receives the firmware request and identifies the model of the MFP 10 on the basis of the information included in the received firmware request. Then, the management server 50 extracts firmware corresponding to the identified model from among the plurality of sets of firmware stored in the data storage area 62 and transmits the extracted firmware to the MFP 10. The MFP 10 receives the firmware and updates the firmware 34 stored in the data storage area 38 to the received firmware (i.e., the firmware of the latest version). After completion of the update of the firmware 34, the MFP 10 is restarted.

After completion of the restart of the MFP 10, the MFP 10 extracts the selected process stored in the data storage area 38, that is, the MFP 10 specifies the selected process on the basis of the selected process information stored in the data storage area 38. Then, the MFP 10 displays the selected process screen 110 corresponding to the selected process on the display 16. That is, in the example described above, as illustrated in FIG. 4, the selected process screen 110 is displayed on the display 16 after completion of the update of the firmware 34 since the facsimile process has been selected as the selected process. After then, on the selected process screen 110, the setting of the facsimile process is made by operating the setting buttons 112 and the start button 114 is operated, whereby the facsimile process is executed.

When a user rejects the update of the firmware 34 and operates the operation button 126 on the notification screen 120, the request for the firmware of the latest version is not made, and thus the update of the firmware 34 is not executed. Thus, when the operation button 126 is operated, the screen corresponding to the selected process, i.e., the selected process screen 110 for the facsimile process is displayed on the display 16. Then, the start button 114 on the selected process screen 110 is operated to execute the facsimile process.

In the above, descriptions have been made to the case where the information about the facsimile process is included in the update information. Hereinafter, a case where the information about the facsimile process is not included in the update information will be described. For example, when the model of the MFP 10 is "model-A" and the apparatus version is "ver. D" (see FIG. 2), information indicating that a new function is added to the scan process by the update is stored in the data storage area 38 as the update information which the MFP 10 has received from the management server 50. Thus, in such a case, it is determined that information relating to the facsimile process is not included in the update information stored in the data storage area 38. Accordingly, in the MFP 10, the notification screen 120 is not displayed on the display 16, but the screen corresponding to the selected process, i.e., the selected process screen 110 for the facsimile process is displayed on the display 16. Then, the start button 114 on the selected process screen 110 is operated to execute the facsimile process.

As described above, upon receiving the update information from the management server 50, the MFP 10 analyzes the received update information and determines the presence/absence of image process to be subjected to update. When the determination indicates that there is no image process to be subjected to update, the received update information is not stored in the data storage area 38. Thus, in this case, a normal process is executed unlike the above process. In the normal process, when a user selects his or her desired image process on the process selection screen 100, the selected process screen corresponding to the selected process is displayed on the display 16, and the selected process is executed in response to a user's operation on the selected process screen.

As described above, when a desired image process is executed from among the plurality of image processes, if the firmware for executing the desired image process is the subject of update, the notification screen 120 indicating that the desired image process is the subject of update is displayed on the display 16. On the other hand, when the desired image process is executed, if the firmware for executing the desired image process is not the subject of update, the notification screen 120 is not displayed on the display 16. With this configuration, the user can be notified that firmware of a new version for user's desired image process is available at the time when the user is about to execute the desired image process. Accordingly, the degree of user's attention to the update of firmware can be enhanced, thereby achieving effective notification of the update of firmware to the user.

Further, in the MFP 10, the summary of update, i.e., information indicating whether the update of the firmware for executing the desired image process brings about addition of a new function or elimination of a defect is displayed on the notification screen 120. With this configuration, a user can adequately determine whether or not to execute the update.

As described above, in the MFP 10, after a user selects a desired image process on the process selection screen 100, the firmware 34 is updated provided that information about the selected image process (i.e., the desired image process) is included in the update information. In the meanwhile, in a conventional image-processing apparatus, after update of firmware is executed and then the image-processing apparatus restarts, a top screen is displayed on a display. Assuming that the above conventional configuration is employed in the MFP 10, in spite of the fact that the desired image process (i.e., the selected process) has already been selected, a top screen is displayed on the display 16 after completion of updating the firmware 34. Thus, in this assumed configuration, it is necessary to select the desired image process once again on the process selection screen 100, which leads deterioration of operability. Considering the above, in the MFP 10, the image process selected on the process selection screen 100 (i.e., the selected process) is stored in the data storage area 38, and after completion of the update of the firmware 34, the screen for executing the stored selected process (e.g., the selected process screen 110) is displayed on the display 16. This configuration allows the user to execute the selected process immediately after the update, thereby improving operability.

<Control Program>

The notification of the update based on the update information is made by executing the control program 36 by the CPU 12 of the MFP 10. Hereinafter, a process flow of the control program 36 will be described while referring to FIGS. 6 and 7.

Figure 6:
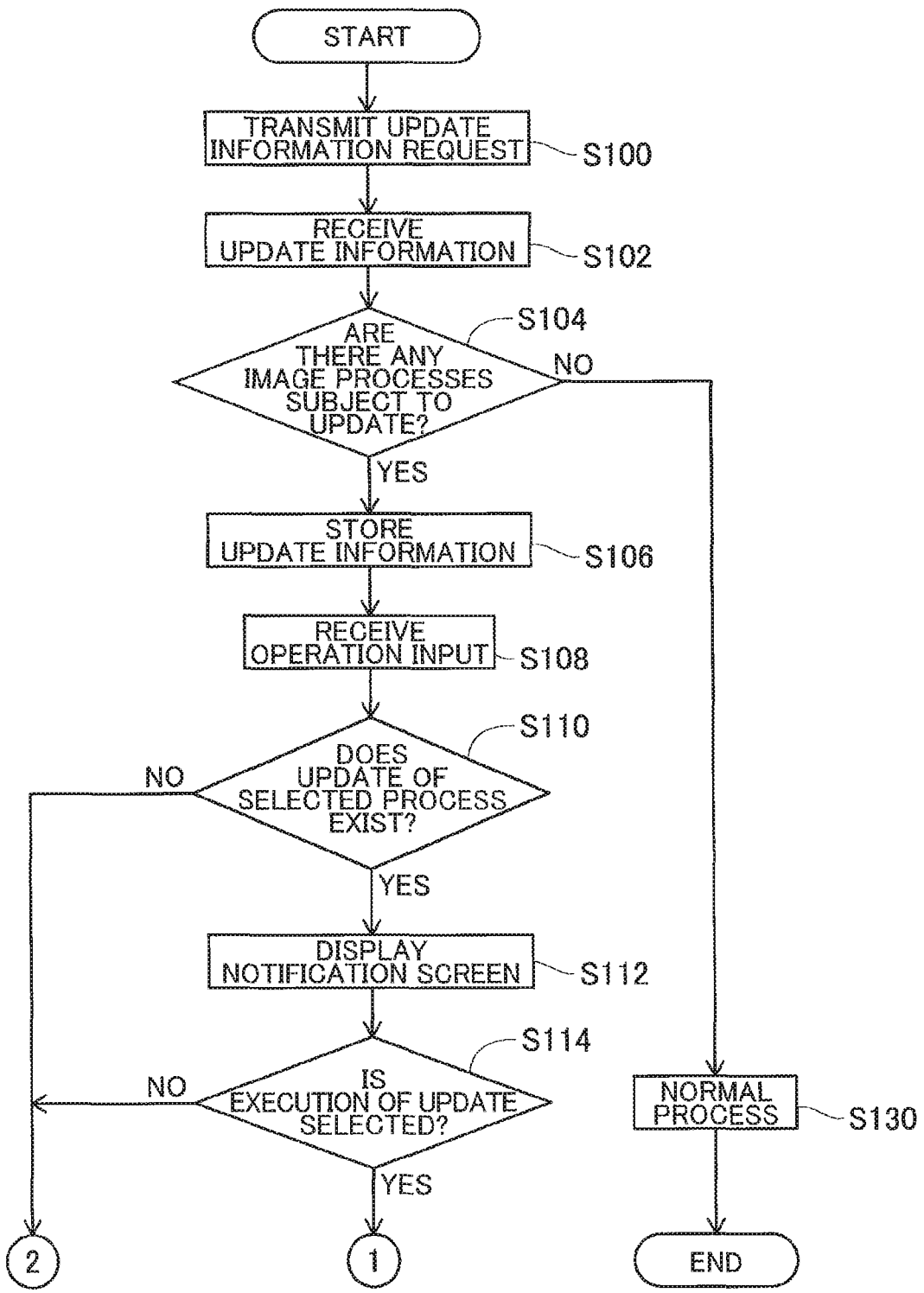
FIG. 6 is a diagram illustrating a part of a flowchart of a control according to a control program stored in the MFP of the communication system according to the first embodiment.
Figure 7:
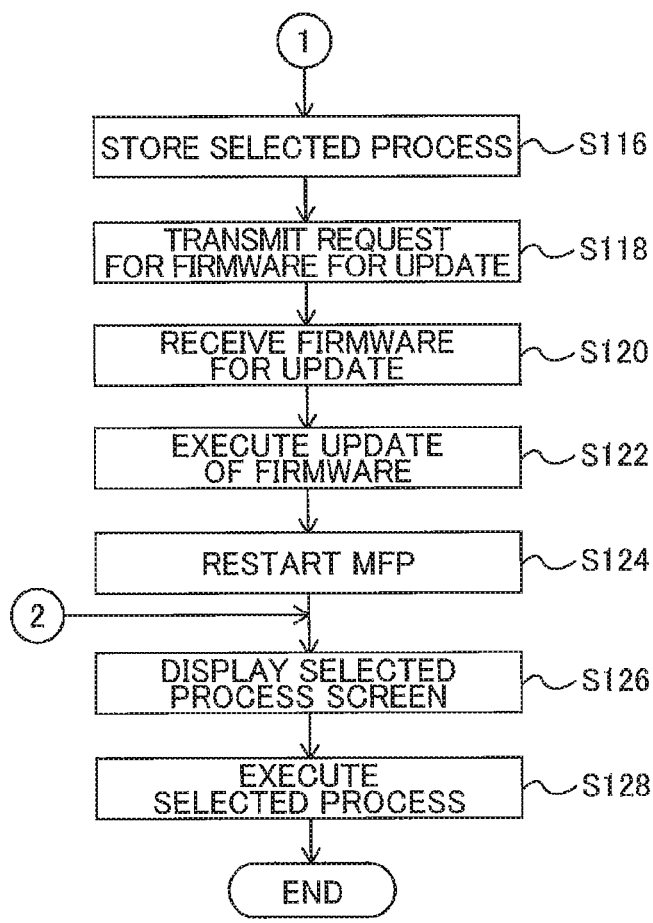
FIG. 7 is a diagram illustrating a part of the flowchart of the control according to the control program stored in the MFP of the communication system according to the first embodiment.

In this flow, the MFP 10 first transmits a request for update information to the management server 50 (S100 in FIG. 6). Then, the MFP 10 receives, via the network I/F 30, update information transmitted from the management server 50 (S102). Subsequently, the MFP 10 determines whether or not there are any image processes to be subjected to update in the received update information (S104). That is, the MFP 10 determines whether or not the difference information contained in the received update information includes information about any image processes.

When there are any image processes subject to update, that is, when the difference information includes information relating to any image processes (YES in S104), the MFP 10 stores the received update information in the data storage area 38 (S106). Subsequently, the MFP 10 receives an operation input to any one of the selection buttons 102, 104, and 106 on the process selection screen 100 (S108). In other words, in S108 the CPU 12 of the MFP 10 receives, via the input I/F 20, an instruction to execute one of the plurality of image processes (i.e., one of the facsimile process, the copy process, and the scan process). Then, the MFP 10 determines whether or not update is available for the selected process corresponding to the received operation input. That is, the MFP 10 determines whether or not information about the selected process (i.e., information about an update of the selected process) is included in the received update information (S110). The information about the selected process is an example of specific information. The firmware for executing the selected process is an example of specific sub firmware.

When information relating to the selected process is included in the received update information (YES in S110), the MFP 10 displays the notification screen 120 on the display 16, i.e., notifies a user of notification information about the update of the selected process (S112). Then, the MFP 10 determines whether or not execution of update is selected on the notification screen 120, that is, whether or not the operation button 124 is operated (S114). When execution of update is selected on the notification screen 120, that is, when the operation button 124 is operated (YES in S114), the MFP 10 stores the selected process in the data storage area 38 (S116 in FIG. 7). In other word, in S116 the MFP 10 stores, in the data storage area 38, selection process information for specifying the selected process.

Then, the MFP 10 transmits a request for firmware for update (i.e., a request for firmware of the latest version) to the management server 50 (S118) and receives the firmware for update from the management server 50 (S120). Upon receiving the firmware for update, the MFP 10 executes update of the firmware 34 (S122). After completion of the update, the MFP 10 is restarted (S124). After completion of the restart, the MFP 10 displays the selected process screen on the display 16 (S126). Then, a predetermined operation is made on the selected process screen, whereby the selected process is executed (S128). Then, this routine is ended.

When information on the selected process is not included in the received update information (NO in S110), or when execution of update is not selected on the notification screen 120 (NO in S114), that is, when the operation button 126 is operated, process of S126 and S128 are executed.

Further, when there is no image process to be subjected to update in S104, that is, when the difference information does not include information relating to any image processes (NO in S104), the normal process is executed (S130). Then, this routine is ended.

Second Embodiment

Next, a communication system according to a second embodiment of the present disclosure will be described while referring to FIGS. 8 to 12. Note that structures and components similar to those in the first embodiment are designated with the same reference numerals to avoid duplicating description. The following description will focus on structures, components, and control that differ from those of the first embodiment.

In the first embodiment, there are provided two modes as to how to deal with update of the firmware 34: one is a mode in which update is executed before execution of the selected process; and the other is a mode in which update is not executed. In the second embodiment, there are provided more types of modes concerning how to deal with the update of the firmware 34.

Specifically, update information in the second embodiment includes not only the summary of update but also details of the update, and the summary of update and the details of update are registered in the table 80 as the update information. Thus, in the second embodiment, the update information transmitted from the management server 50 to the MFP 10 includes not only the summary of update but also details of update. The details of update indicate details of contents to be improved by the update of the firmware 34. For example, when the summary of update indicates addition of a new function, the details of update indicate details of the new function to be added; on the other hand, when the summary of update indicates removal of a defect, the details of the update indicate details of the defect to be removed.

Figure 8:
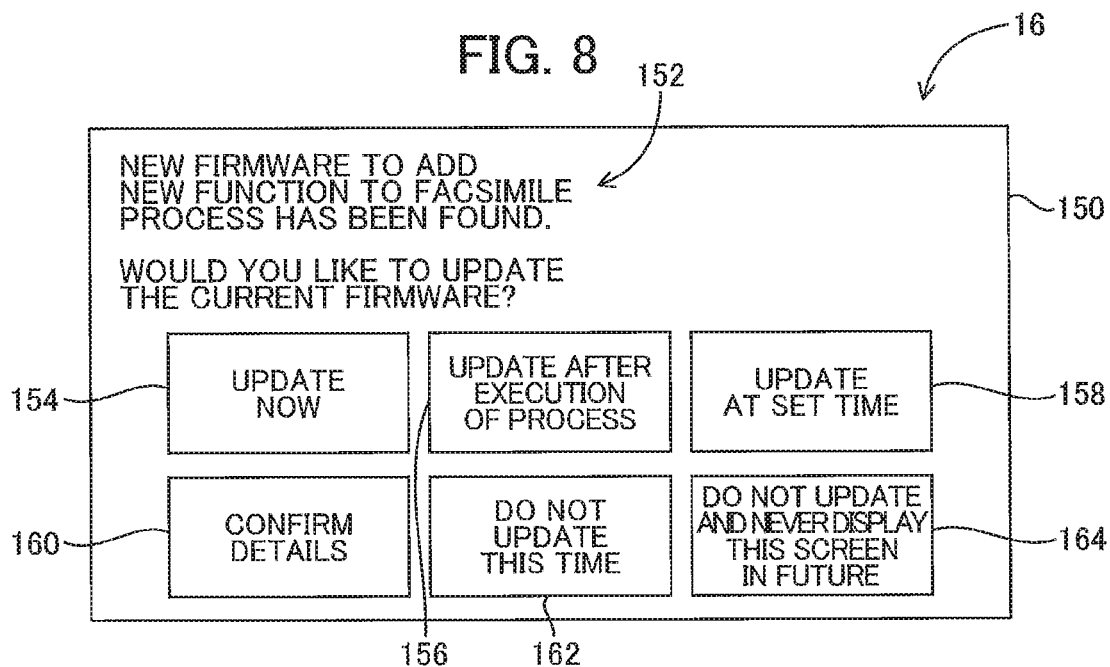
FIG. 8 is a diagram illustrating a notification screen displayed on a display of an MFP of a communication system according to a second embodiment of the present disclosure.
Figure 9:
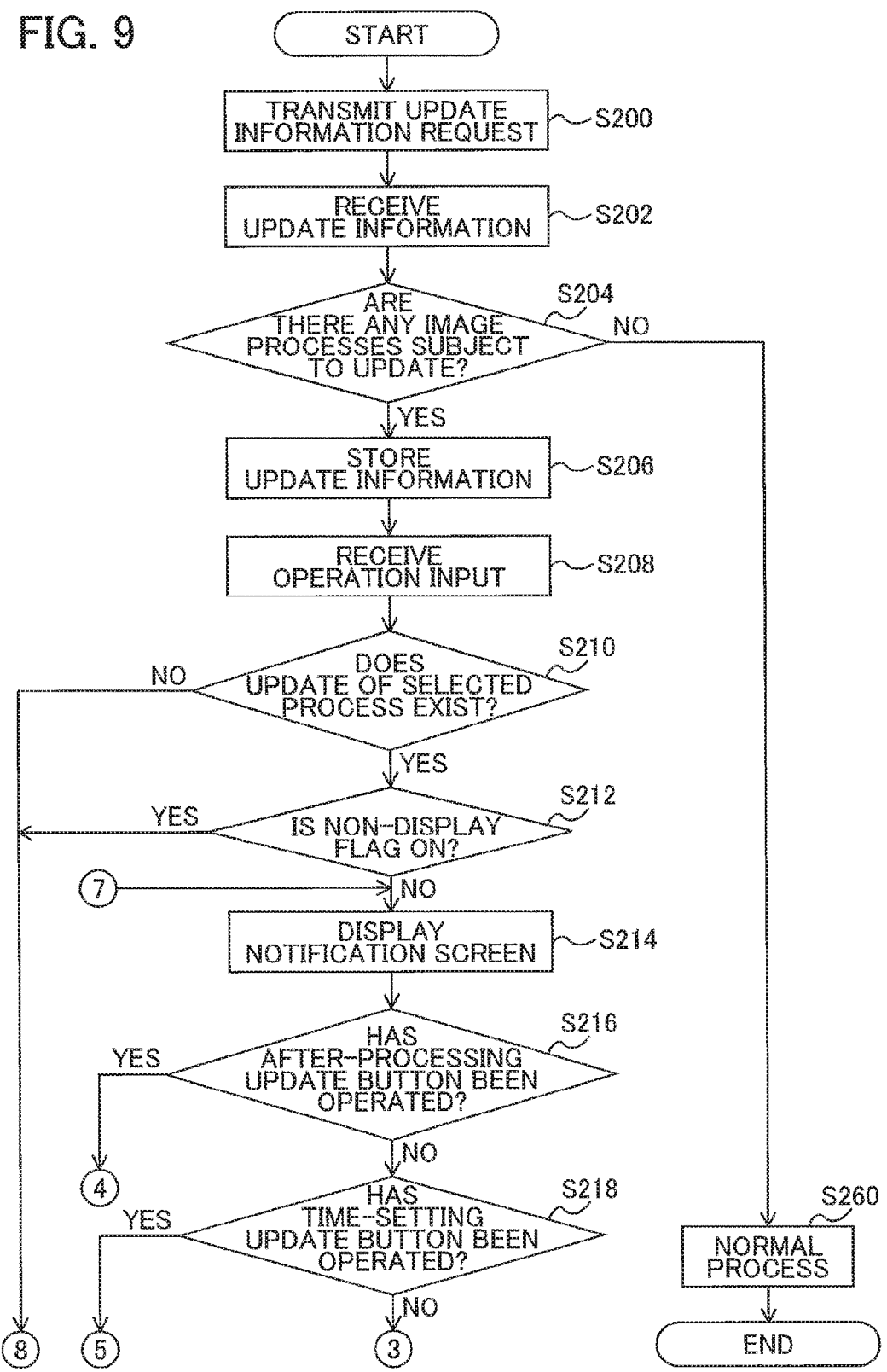
FIG. 9 is a diagram illustrating a part of a flowchart of a control according to a control program stored in the MFP of the communication system according to the second embodiment.
Figure 10:
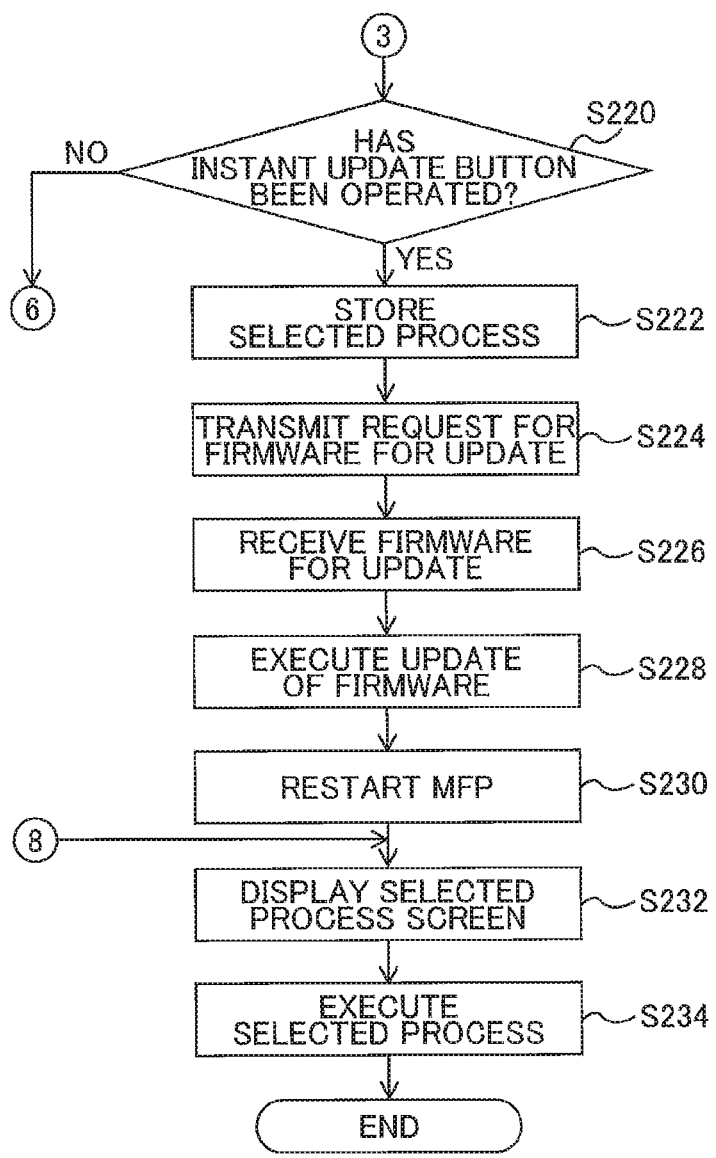
FIG. 10 is a diagram illustrating a part of the flowchart of the control according to the control program stored in the MFP of the communication system according to the second embodiment.

Further, in the second embodiment, at the timing when the notification screen 120 is displayed in the first embodiment, a notification screen 150 illustrated in FIG. 8 is displayed in place of the notification screen 120. Similarly to the notification screen 120, there is displayed on the notification screen 150 a comment 152 notifying a user of the existence of new firmware and a summary as to update to the new firmware. For example, a comment 152 notifying a user of the existence of new firmware to add a new function to the facsimile is displayed on the notification screen 150. The notification screen 150 includes an instant update button 154, an after-processing update button 156, a time-setting update button 158, a detail check button 160, a non-update button 162, and a non-update/non-display button 164.

The instant update button 154 is a button for instantly executing the update of the firmware and corresponds to the operation button 124 on the notification screen 120 displayed in the first embodiment. The after-processing update button 156 is a button for executing the update of the firmware after execution of the selected process. The time-setting update button 158 is a button for setting a desired time period and also executing the update of the firmware 34 after the elapse of the set time period. The detail check button 160 is a button for checking the details of the update. The non-update button 162 is a button for not permitting the update of the firmware 34 and corresponds to the operation button 126 on the notification screen 120 displayed in the first embodiment. The non-update/non-display button 164 is a button for not permitting the update of the firmware 34 and for inhibiting the notification screen 150 from being displayed in future.

When the instant update button 154 is operated on the notification screen 150, the update of the firmware 34 is instantly executed. The processes executed when the instant update button 154 is operated are the same as those when the operation button 124 on the notification screen 120 of the first embodiment is operated, so description thereof will be omitted.

When the after-processing update button 156 is operated on the notification screen 150, a screen for executing the selected process, for example, the selected process screen 110 illustrated in FIG. 4 is displayed on the display 16. A predetermined operation is performed on the screen, whereby the selected process is executed. After completion of execution of the selected process, the MFP 10 transmits a request for firmware for update (i.e., a request for firmware of the latest version) to the management server 50 and receives the firmware for update from the management server 50. Then, the MFP 10 executes the update of the firmware 34 and is thereafter restarted. With this configuration, the selected process can be executed before execution of the update, thereby allowing the selected process to be executed at an early stage.

When the time-setting update button 158 is operated on the notification screen 150, a time setting screen (not illustrated) for setting a desired time period is displayed on the display 16. A user sets a desired time period on the time setting screen. After setting the desired time period on the time setting screen, a screen for executing the selected process is displayed on the display 16. A predetermined operation is performed on the screen, whereby the selected process is executed. The MFP 10 determines, using a counter (not illustrated) incorporated therein, whether or not the time period set on the time setting screen has elapsed. When the time period set on the time setting screen has elapsed, the MFP 10 transmits a request for firmware for update to the management server 50 and receives the firmware for update from the management server 50. Then, the MFP 10 executes the update of the firmware and is thereafter restarted. With this configuration, the update of the firmware 34 can be executed at a user's desired timing.

When the detail check button 160 is operated on the notification screen 150, details of update relating to the selected process are extracted from the update information stored in the data storage area 38. Then, a screen (hereinafter, referred to as "detailed information screen") (not illustrated) for notifying a user of the extracted detailed information about the update is displayed on the display 16. The detailed information screen includes a return button. When the return button is operated, the notification screen 150 is displayed on the display 16 in place of the detailed information screen. With this configuration, a user can recognizing the details of the update and thus adequately determine whether or not to execute the update.

When the non-update button 162 is operated on the notification screen 150, update of the firmware 34 is not executed, but a screen for executing the selected process is displayed on the display 16. In response to a predetermined operation being performed on the screen, the selected process is executed. The processes executed when the non-update button 162 is operated are the same as those when the operation button 126 on the notification screen 120 of the first embodiment is operated, so description thereof will be omitted.

When the non-update/non-display button 164 is operated on the notification screen 150, similarly to the case where the non-update button 162 is operated, the update of the firmware 34 is not executed but a screen for executing the selected process is displayed on the display 16. In response to a predetermined operation being performed on the screen, the selected process is executed. However, when the non-update/non-display button 164 is operated, the notification screen 150 is not displayed from now on. Specifically, when the non-update/non-display button 164 is operated, a non-display flag is set to ON. Then, the non-display flag is referred to before display of the notification screen 150 on the display 16. When the non-display flag is OFF, the notification screen 150 is displayed, while when the non-display flag is ON, the notification screen 150 is not displayed. With this configuration, a user who does not wish to receive notification of the update of the firmware 34 can make a setting such that notification of the update is not displayed.

As described above, in the second embodiment, there are prepared six modes concerning how to deal with update of the firmware 34, and a desired mode can be selected from among the six modes. As a result, execution or non-execution of the update in various modes, or check of the details of the update can be performed, thus improving operability.

The notification of the update in the second embodiment is made by executing the control program 36 by the CPU 12 of the MFP 10. Hereinafter, a process flow of the control program 36 will be described while referring to FIGS. 9 to 12. The process flow in the second embodiment has many portions common to that in the first embodiment, and description of the common portions will be omitted or simplified.

In this flow, although the process from S200 to S210 (FIG. 9) is performed, the process from S200 to S210 is the same as the process from S100 to S110 (FIG. 6), so description thereof will be omitted. When it is determined in S210 that information relating to the selected process is included in the update information (YES in S210), it is determined whether or not the non-display flag is ON (S212). When the non-display flag is not ON (NO in S212), that is, when the non-display flag is OFF, the MFP 10 displays the notification screen 150 on the display 16 (S214).

Then, the MFP 10 determines whether or not the after-processing update button 156 has been operated on the notification screen 150 (S216). When the after-processing update button 156 has not been operated on the notification screen 150 (NO in S216), the MFP 10 determines whether or not the time-setting update button 158 has been operated on the notification screen 150 (S218). When the time-setting update button 158 has not been operated on the notification screen 150 (NO in S218), the MFP 10 determines whether or not the instant update button 154 has been operated on the notification screen 150 (S220 in FIG. 10). When the instant update button 154 has been operated on the notification screen 150 (YES in S220), the process from S222 to S234 are performed. The process from S222 to S234 are the same as the process from S116 to S128 (FIG. 7), so description thereof will be omitted. Then, this routine is ended.

When the after-processing update button 156 has been operated on the notification screen 150 (YES in S216), the process from S236 to S246 (FIG. 11) are performed. The process from S236 to S246 are the same as the process of S126, S128, and S118 to S124 (FIG. 7), so description thereof will be omitted. Then, this routine is ended.

Figure 11:
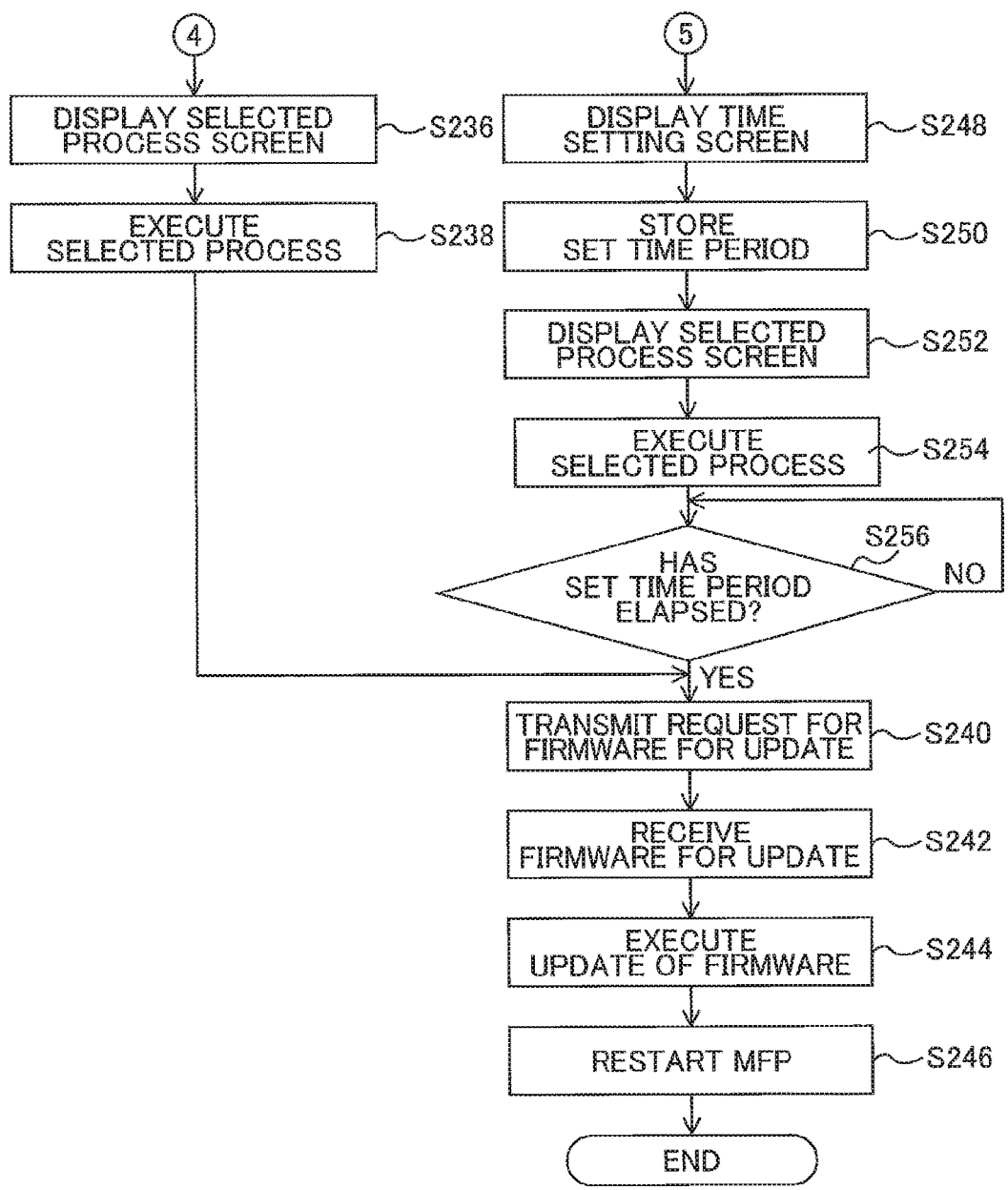
FIG. 11 is a diagram illustrating a part of the flowchart of the control according to the control program stored in the MFP of the communication system according to the second embodiment.
Figure 12:
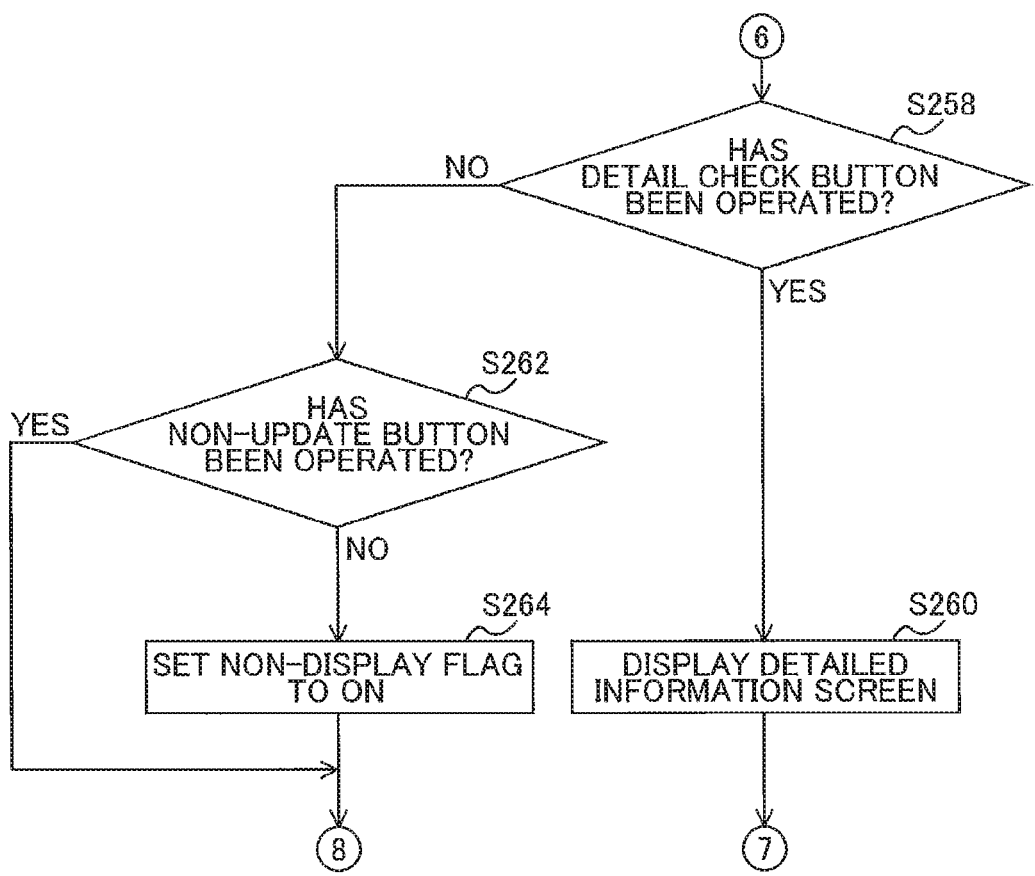
FIG. 12 is a diagram illustrating a part of the flowchart of the control according to the control program stored in the MFP of the communication system according to the second embodiment.

When the time-setting update button 158 has been operated on the notification screen 150 (YES in S218), the time setting screen is displayed on the display 16 (S248 in FIG. 11). Then, the time period which has been set on the time setting screen is stored in the data storage area 38 (S250). Subsequently, the selected process screen is displayed on the display 16 (S252). In response to a predetermined operation being performed on the selected process screen 110, the selected process is executed (S254). Then, it is determined whether or not the time period set on the time setting screen has elapsed (S256). When the set time period has not elapsed (NO in S256), the process of S256 is repeatedly executed. On the other hand, when the set time period has elapsed (YES in S256), the process of S240 and subsequent steps are executed, and then this routine is ended.

When the instant update button 154 has not been operated on the notification screen 150 (NO in S220), the MFP 10 determines whether or not the detail check button 160 has been operated on the notification screen 150 (S258). When the detail check button 160 has been operated on the notification screen 150 (YES in S258), the MFP 10 displays the detailed information screen on the display 16 (S260). Then, the MFP 10 returns to S214.

When, in S258, the detail check button 160 has not been operated on the notification screen 150 (NO in S258), the MFP 10 determines whether or not the non-update button 162 has been operated (S262). When the non-update button 162 has not been operated (NO in S262), that is, when the non-update/non-display button 164 has been operated, the non-display flag is set to ON (S264). Then, the process of S232 and subsequent steps are executed, and this routine is ended.

When, in S262, the non-update button 162 has been operated (YES in S262), the process of S232 and steps subsequent thereto are executed, and this routine is ended.

Third Embodiment

Figure 13:
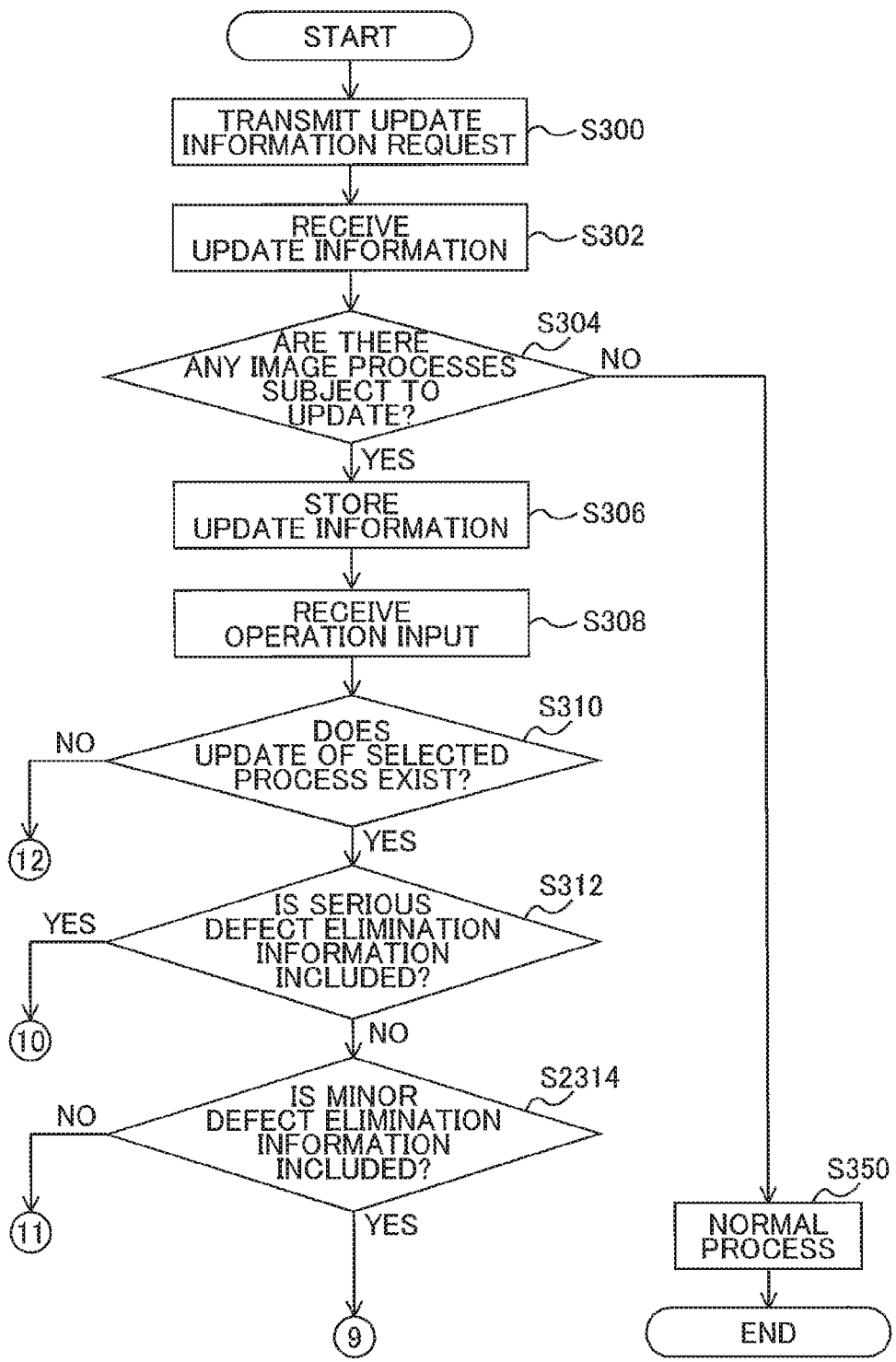
FIG. 13 is a diagram illustrating a part of a flowchart of a control according to a control program stored in an MFP of a communication system according to a third embodiment.
Figure 14:
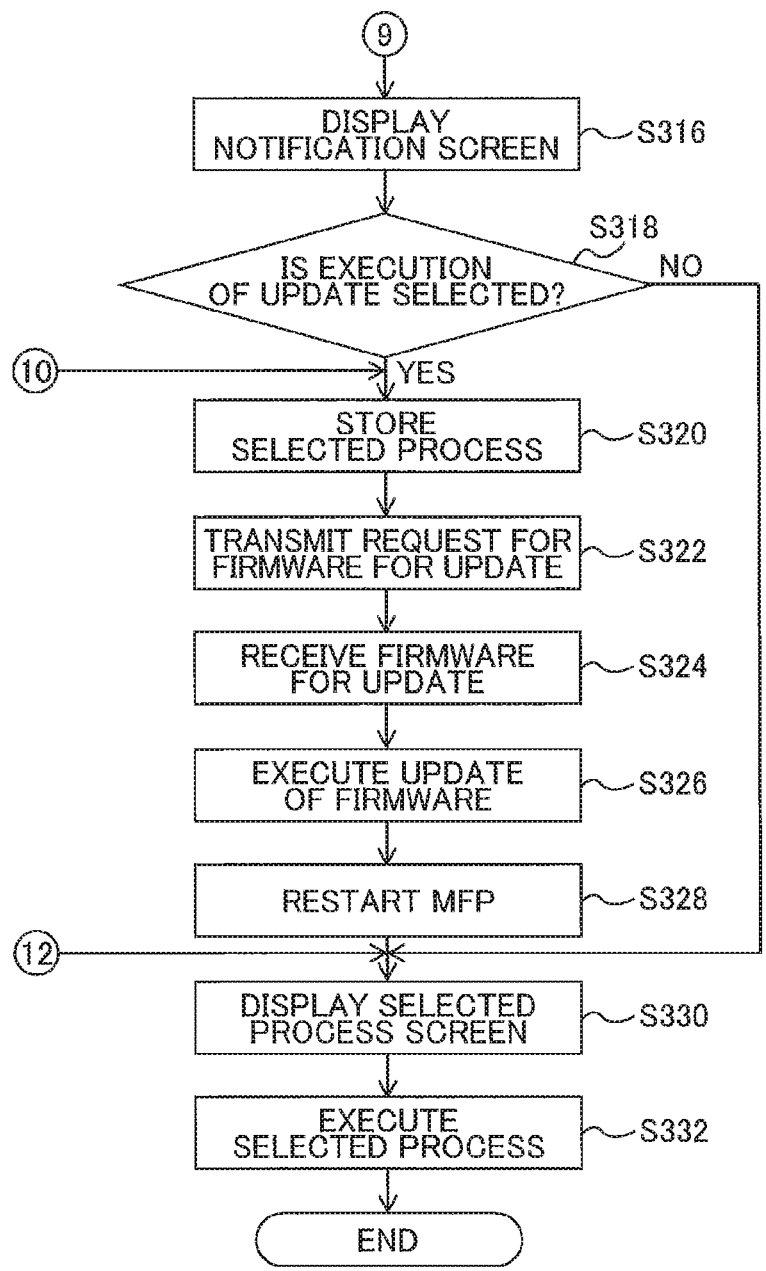
FIG. 14 is a diagram illustrating a part of the flowchart of the control according to the control program stored in the MFP of the communication system according to the third embodiment.
Figure 15:
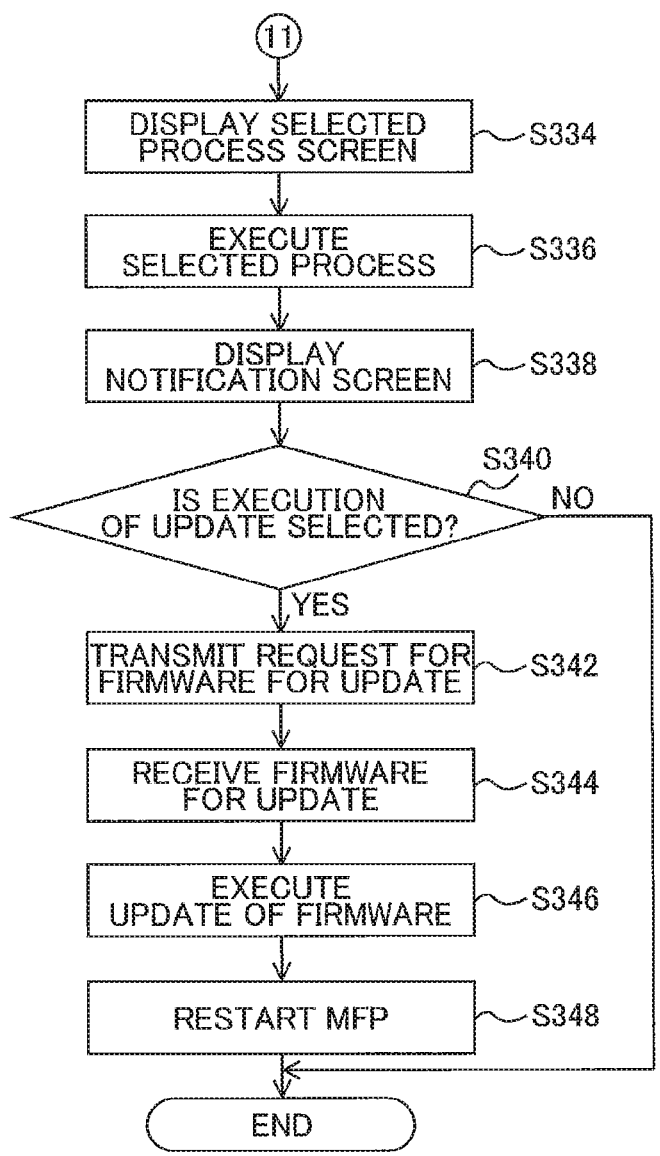
FIG. 15 is a diagram illustrating a part of the flowchart of the control according to the control program stored in the MFP of the communication system according to the third embodiment.

Next, a communication system according to a third embodiment of the present disclosure will be described while referring to FIGS. 13 to 15. Note that structures and components similar to those in the first embodiment are designated with the same reference numerals to avoid duplicating description. The following description will focus on structures, components, and control that differ from those of the first embodiment and the second embodiment.

In the above embodiments, the notification screen 120 (or 150) notifying a user of existence of update is displayed before execution of the selected process without exception; however, in the third embodiment, the notification screen notifying of existence of update is displayed according to the content of the update.

Specifically, as described above, the update information of the first embodiment includes information indicating a summary of update, and the information is classified into information (hereinafter, referred to as "defect elimination information") about a defect to be eliminated by the update and information (hereinafter, referred to as "additional function information") on a function to be added by the update.

On the other hand, in the update information of the third embodiment, the defect elimination information included in the information indicating the summary of update is further classified into minor defect elimination information and serious defect elimination information. That is, in the update information of the third embodiment, the information indicating the summary of update is classified into: the additional function information; the minor defect elimination information; and the serious defect elimination information, which are stored in the table 80 in the data storage area 62 of the management server 50. In other words, a summary of update indicated by the additional function information, a summary of update indicated by the minor defect elimination information, and a summary of update indicated by the serious defect elimination information are stored in the table 80 of the management server 50. Accordingly, also in the update information transmitted from the management server 50 to MFP 10, the information indicating the summary of update is classified into the additional function information, the minor defect elimination information, and the serious defect elimination information.

The minor defect elimination information is defect elimination information when the defect to be eliminated by update is a defect that has no influence on execution of the image process, and the serious defect elimination information is defect elimination information when the defect to be eliminated by update is a defect that may affect execution of the image process. The minor defect elimination information indicates, for example, correction of the display content displayed on the screens (including the process selection screen 100) at the time of execution of the image process, reduction in processing time for image, suppression of power consumption during the image process, and suppression of an ink use amount when the image process is copy process. The serious defect elimination information indicates, for example, elimination of the missing of an image when the image is partially missed during the image process and the like.

The MFP 10 receives, from the management server 50, the update information including the summary of update that is classified into the additional function information, the minor defect elimination information, and the serious defect elimination information. After receiving the update information, the MFP 10 stores the received update information in the data storage area 38. Then, when the selected process is selected on the process selection screen 100, the MFP 10 determines whether or not information about the selected process is included in the received update information as in the above-described embodiments. At this time, in the first and second embodiments, the notification screen 120 (or 150) is displayed on the display 16 provided that the information about the selected process is included in the update information.

On the other hand, in the third embodiment, when the information about the selected process is included in the received update information, the MFP 10 determines whether or not the update information includes the serious defect elimination information. When the update information does not include the serious defect elimination information, the MFP 10 determines whether or not the update information includes the minor defect elimination information. When the update information includes the minor defect elimination information, the MFP 10 displays the notification screen 120 on the display 16. That is, when the update information does not include the serious defect elimination information but includes the minor defect elimination information, the notification screen 120 is displayed before execution of the selected process, thereby allowing a user to select whether or not to execute the update on the notification screen 120. Then, after execution of the update or after rejection of the update on the notification screen 120, a screen for executing the selected process, for example, the selected process screen 110 is displayed, and the selected process is executed.

On the other hand, when the update information includes the serious defect elimination information, the notification screen 120 is not displayed, and the MFP 10 transmits a request for firmware for update to the management server 50 and receives the firmware for update from the management server 50. Note that the processes to be executed after the MFP 10 receives the firmware for update are the same as those in the above embodiments, so description thereof will be omitted. That is, when the update information includes the serious defect elimination information, a user cannot select whether or not to execute the update, and the update is forcibly executed. After completion of the update, a screen for executing the selected process is displayed, and the selected process is executed. As described above, when there is any defect that may affect execution of the image process, the update is forcibly executed. Therefore, the defect that may affect execution of the image process is eliminated before execution of the selected process. As a result, adequate execution of the selected process can be ensured.

Further, when neither the serious defect elimination information nor the minor defect elimination information is included in the update information, that is, when the update information includes the additional function information, the MFP 10 displays a screen for executing the selected process on the display 16. Then, after the selected process is executed through a predetermined operation on the screen, the MFP 10 displays the notification screen 120 on the display 16. That is, when the update information does not include the serious defect elimination information or the minor defect elimination information but includes the additional function information, the notification screen 120 is displayed after execution of the selected process, thereby allowing a user to select whether or not to execute the update.

As described above, when the update information does not include the serious defect elimination information but includes the minor defect elimination information, the notification screen 120 is displayed before execution of the selected process; and when the update information includes neither the serious defect elimination information nor the minor defect elimination information but includes the additional function information, the notification screen 120 is displayed after execution of the selected process. That is, when an image process having a defect minor enough not to affect execution of the image process is selected as the selected process, the notification screen 120 is displayed before execution of the selected process. This allows even a minor defect to be eliminated before execution of the selected process, whereby adequate execution of the selected process can be ensured. On the other hand, when an image process having no defect is selected as the selected process and there is prepared a new function for the selected process, the notification screen 120 is displayed after execution of the selected process. As a result, the image process having no defect can be executed at an early stage, and thereafter a user can be notified of the existence of the update. As described above, in the third embodiment, user convenience is improved by displaying the notification screen 120 at an adequate timing.

As stated above, in the third embodiment, the CPU 12 of the MFP 10 determines or sets, on the basis of the difference information included in the received update information, a display timing of displaying the notification screen 120 (i.e., a notification timing of notifying a user of information about the update of the firmware for the selected process). That is, when the update information does not include the serious defect elimination information but includes the minor defect elimination information, the notification screen 120, the CPU 12 sets the display timing (i.e., the notification timing) to a timing before execution of the selected process. On the other hand, when the update information includes neither the serious defect elimination information nor the minor defect elimination information but includes the additional function information, the CPU 12 sets the display timing (i.e., the notification timing) to a timing after execution of the selected process.

The notification of the update in the third embodiment is made by executing the control program 36 by the CPU 12 of the MFP 10. Hereinafter, a process flow of the control program 36 will be described while referring to FIGS. 13 to 15. The process flow in the third embodiment has many portions common to that in the first embodiment, and description of the common portions will be omitted or simplified.

In this flow, although the process from S300 to S310 (FIG. 13) is performed, the process from S300 to S310 is the same as the process from S100 to S110 (FIG. 6), so description thereof will be omitted. When it is determined in S310 that information on the selected process is included in the received update information (YES in S310), the MFP 10 determines whether or not the serious defect elimination information is included in the update information (S312). When the serious defect elimination information is not included in the update information (NO in S312), the MFP 10 determines whether or not the minor defect elimination information is included in the received update information (S314). When the minor defect elimination information is included in the update information (YES in S314), the process from S316 to S332 (FIG. 14) is performed. The process from S316 to S332 is the same as the process from S112 to S128 (FIGS. 6 and 7), so description thereof will be omitted.

When, in S312, the serious defect elimination information is included in the update information (YES in S312), the process of S320 (FIG. 14) and subsequent steps are executed, and then this routine is ended.

When, in S314, the minor defect elimination information is not included in the update information (NO in S314), that is, the additional function information is included in the update information, the process from S334 to S348 (FIG. 15) is performed. The processes from S334 to S348 are the same as the processes of S126, S128, and S112 to S124 (FIGS. 6 and 7), so description thereof will be omitted.

Although descriptions have been made to the embodiments of the present disclosure, the present invention is not limited to the above-described embodiments but may be embodied in various modifications and improvements based on knowledge of those skilled in the art.

Specifically, for example, although both the update information and firmware for update (firmware of the latest version) are stored in the management server 50 in the above embodiments, they may be stored in mutually different servers. That is, the MFP 10 may receive the update information from a server that stores the same and may receive the firmware for update from another server that stores the same.

Further, in the above embodiments, the update information is displayed on the display 16 for notification to a user. Alternatively, for notifying a user of the update information, the update information may be outputted with voice or may be printed on a sheet.

Further, in the second embodiment, when the time-setting update button 158 is operated on the notification screen 150, the time setting screen for setting a desired time period is displayed on the display 16. Alternatively, when the time-setting update button 158 is operated on the notification screen 150, a second time setting screen for setting a desired time instant to execute update of the firmware 34 may be displayed on the display 16, in place of the time setting screen of the second embodiment. In this case, a desired time instant is set by a user on the second time setting screen, and then the MFP 10 executes the update of the firmware 34 at the set time instant.

Further, the processes illustrated in FIGS. 6, 7 and 9 to 15 are executed by the CPU 12 in the above embodiments. However, the above processes may be executed by an ASIC or another logical integrated circuit, rather than the CPU 12, or may be executed in cooperation with the CPU, ASIC and another logical integrated circuit.

What is claimed is:

1. An image-processing apparatus comprising:
a communication interface;
an input interface;
a storage storing firmware for executing a plurality of types of image processes, the firmware comprising a plurality of sets of sub firmware for executing respective ones of the plurality of types of image processes; and
a controller capable of executing the plurality of types of image processes in accordance with the firmware, the controller being configured to perform:
receiving update information from a server via the communication interface, the update information being about an update of the firmware;
in response to receiving via the input interface an instruction to execute a selected one of the plurality of types of image processes, determining whether the received update information includes specific information about an update of specific sub firmware, the specific sub firmware being one of the plurality of sets of sub firmware and being for executing the selected one of the plurality of types of image processes; and
in response to determining that the received update information includes the specific information about the update of the specific sub firmware for executing the selected one of the plurality of types of image processes, notifying of notification information about the update of the specific sub firmware on the basis of the specific information.

2. The image-processing apparatus according to claim 1, wherein the specific information includes difference information about differences between:
the firmware stored in the storage; and
new firmware for the update of the firmware, and
wherein the notifying notifies of the difference information as the notification information.

3. The image-processing apparatus according to claim 2, wherein the controller is configured to further perform setting, on the basis of the difference information, a notification timing of performing the notifying.

4. The image-processing apparatus according to claim 3, wherein the difference information includes at least one of:
additional function information about a function to be added to the one of the plurality of image processes by the update of the firmware; and defect elimination information about a defect to be eliminated from the one of the plurality of image processes by the update of the firmware,
wherein, when the defect elimination information is included in the difference information, the setting sets the notification timing to a first timing, the first timing being a timing before executing the one of the plurality of image processes, and
wherein, when the defect elimination information is not included in the difference information and the additional function information is included in the difference information, the setting sets the notification timing to a second timing, the second timing being a timing after executing the one of the plurality of image processes.

5. The image-processing apparatus according to claim 3, wherein the difference information includes at least one of defect elimination information and additional function information.

6. The image-processing apparatus according to claim 5, wherein the defect elimination information includes at least one of minor defect information and serious defect information.

7. The image-processing apparatus according to claim 1, wherein the controller is configured to further perform executing the one of the plurality of image processes after performing the notifying.

8. The image-processing apparatus according to claim 7, further comprising a display,
wherein the controller is configured to further perform displaying a screen on the display, the screen being for selecting one from among a plurality of modes concerning how to deal with the update of the firmware.

9. The image-processing apparatus according to claim 8, wherein the plurality of modes includes a specific mode, and
wherein, in the specific mode, a time period is capable of being set and the update of the firmware is executed after elapse of the set time period.

10. The image-processing apparatus according to claim 1, further comprising a display,
wherein the controller is configured to further perform:
executing the update of the firmware;
after performing the executing the update, restarting the image-processing apparatus; and
after performing the restarting, displaying on the display a second screen for executing the one of the plurality of processes.

11. A non-transitory computer readable storage medium storing a set of instructions for an image-processing apparatus comprising:
a communication interface;
an input interface;
a storage storing firmware for executing a plurality of types of image processes, the firmware comprising a plurality of sets of sub firmware for executing respective ones of the plurality of types of image processes; and
a controller capable of executing the plurality of types of image processes in accordance with the firmware,
the set of program instructions, when executed by the controller, causing the image-processing apparatus to perform:
receiving update information from a server via the communication interface, the update information being about an update of the firmware;
in response to receiving via the input interface an instruction to execute a selected one of the plurality of types of image processes, determining whether the received update information includes specific information about an update of specific sub firmware, the specific sub firmware being one of the plurality of sets of sub firmware and being for executing the selected one of the plurality of types of image processes; and
in response to determining that the received update information includes the specific information about the update of the specific sub firmware for executing the selected one of the plurality of types of image processes, notifying of notification information about the update of the specific sub firmware on the basis of the specific information.

12. A communication system comprising an image-processing apparatus and a server,
the image-processing apparatus comprising:
a communication interface;
an input interface;
a storage storing firmware for executing a plurality of types of image processes, the firmware comprising a plurality of sets of sub firmware for executing respective ones of the plurality of types of image processes; and
a controller capable of executing the plurality of types of image processes in accordance with the firmware,
the server comprising a storage storing update information about an update of the firmware,
the controller being configured to perform:
receiving the update information from a server via the communication interface;
in response to receiving via the input interface an instruction to execute a selected one of the plurality of types of image processes, determining whether the received update information includes specific information about an update of specific sub firmware, the specific sub firmware being one of the plurality of sets of sub firmware and being for executing the selected one of the plurality of types of image processes; and
in response to determining that the received update information includes the specific information about the update of the specific sub firmware for executing the selected one of the plurality of types of image processes, notifying of notification information about the update of the specific sub firmware on the basis of the specific information.

* * * * *